United States Patent [19]
Polka

[11] Patent Number: 5,358,313
[45] Date of Patent: Oct. 25, 1994

[54] ADJUSTABLE WHEEL LINER FOR TRUCKS

[76] Inventor: John G. Polka, 1355 Margate, Libertyville, Ill. 60048

[21] Appl. No.: 75,649

[22] Filed: Jun. 11, 1993

[51] Int. Cl.⁵ ............................................. B60B 7/06
[52] U.S. Cl. .................................. 301/37.37; 301/37.1; 301/108.4
[58] Field of Search ................. 301/37.1, 37.37, 108.1, 301/108.4, 37.38

[56] References Cited

U.S. PATENT DOCUMENTS

| | | | |
|---|---|---|---|
| 2,944,853 | 7/1960 | Lyon | 301/37.37 |
| 3,078,124 | 2/1963 | Mulder | 301/37.38 |
| 3,092,420 | 6/1963 | Baldwin et al. | 301/37.38 |
| 4,606,582 | 8/1986 | Warren | 301/108.4 X |
| 4,761,040 | 8/1988 | Johnson | 301/108.4 X |
| 4,881,783 | 11/1989 | Campbell | 301/108.4 X |

Primary Examiner—Russell D. Stormer
Attorney, Agent, or Firm—Patnaude, Videbeck & Marsh

[57] ABSTRACT

A wheel liner for covering portions of a truck wheel has a liner member having a tubular configuration which conforms generally to the inner portion of the tubular section of a truck wheel and has an adjustable bracket for retaining that liner to the threaded studs at the distal end of the oil hub.

5 Claims, 3 Drawing Sheets

ADJUSTABLE WHEEL LINER FOR TRUCKS

The present invention relates to a decorative wheel liner to be secured to the rear wheel of a truck and specifically to an adjustable wheel liner which can be adapted to fit wheels of a given diameter, but having a variety of widths.

BACKGROUND OF THE INVENTION

Each rear wheel of a truck consists of a cylindrical section to which a tire is secured and a generally planer section transverse to one end of the cylindrical section. The planar section is adapted to be attached to the hub of a truck axle with the cylindrical section extending outwardly therefrom with the inside of the cylindrical section of the wheel being visible from outside of the truck.

To enhance the exterior appearance of the rear wheels of trucks, wheel liners are provided which fit within the tubular section of the wheel. Wheel liners in accordance with the prior art have a planar web section that rests against the planar section of the wheel and a tubular section which extends across the width of the cylindrical section of the wheel to the outermost lip. In accordance with the prior art, the web sections of such wheel liners have a plurality of transverse holes which can be aligned to fit over a plurality of studs used to retain the wheels to the axles. The lug nuts, which attach to the studs to retain the wheel to the axle, also retain the wheel liner.

The wheels of certain trucks must be inspected from time to time to insure that the metal portion of the wheel adjacent the retaining lug nuts has not deteriorated. Where a wheel liner is attached by the same lug nuts that retain the truck wheel, the wheel liner must be removed to inspect the wheel. However, 400 to 450 ft.-lbs. of torque are required to properly secure such lug nuts, and the removal and replacement of such lug nuts therefore requires a high impact air compressor. It is therefore difficult and time consuming to inspect a wheel with a liner attached to the lug nuts thereof. Furthermore, although truck wheels are available in given diameters, different manufacturers of truck wheels have different widths for the tubular portion of the truck wheel, such that suppliers of wheel covers in accordance with the prior art must maintain an expensive inventory which requires a substantial storage space. Alternately, adjustable wheel covers are available which have first and second tubular portions which telescope one within the other as disclosed in U.S. Pat. No. 5,042,881. Existing adjustable wheel covers, however, are attachable to the lug nuts retaining the wheel to the axle as previously described. It would therefore be desirable to provide a wheel cover which will fit within a variety of widths of wheels for a given diameter and not require an attachment to the lug nuts.

BRIEF DESCRIPTION OF THE INVENTION

Briefly, the present invention is embodied in a wheel liner for covering portions of a truck wheel of the type having a generally planar hub section and a generally tubular section extending outwardly of the hub section and over which a tire is adapted to be mounted. The hub section of such a wheel is adapted to be mounted over a plurality of wheel mounting studs on the truck axle, and such truck axles have a centrally located oil hub which extends axially outwardly of the wheel mounting studs, and the oil hub also has a plurality of threaded studs at the distal end thereof.

The present invention provides for a liner member having a tubular configuration which conforms generally to the inner portion of the tubular section of the truck wheel and has means for retaining that liner to the threaded studs at the distal end of the oil hub.

The invention includes a plurality of longitudinally adjustable brackets, each bracket having a first end and a second end. Each bracket has means at the first end for attachment to a threaded stud on an oil hub of an axle, and means at the second end for attachment of the bracket to the liner member.

In another embodiment of the present invention, a tubular cover having an external annular flange at the open end thereof, known in the art as a high hat, is fitted over the oil hub of the axle and attached to the liner member.

By adjustment of the brackets, a liner member in accordance with the present invention can be fitted into the tubular portion of a wheel having any number of widths. Furthermore, the liner member in accordance with the present invention can be removed without first removing the lug nuts retaining the wheel to the axle.

GENERAL DESCRIPTION OF THE DRAWINGS

A better understanding of the present invention can be had by reading of the following detailed description taken in conjunction with the accompanying drawings wherein.

DETAILED DESCRIPTION OF A PREFERRED EMBODIMENT

Figure 1:
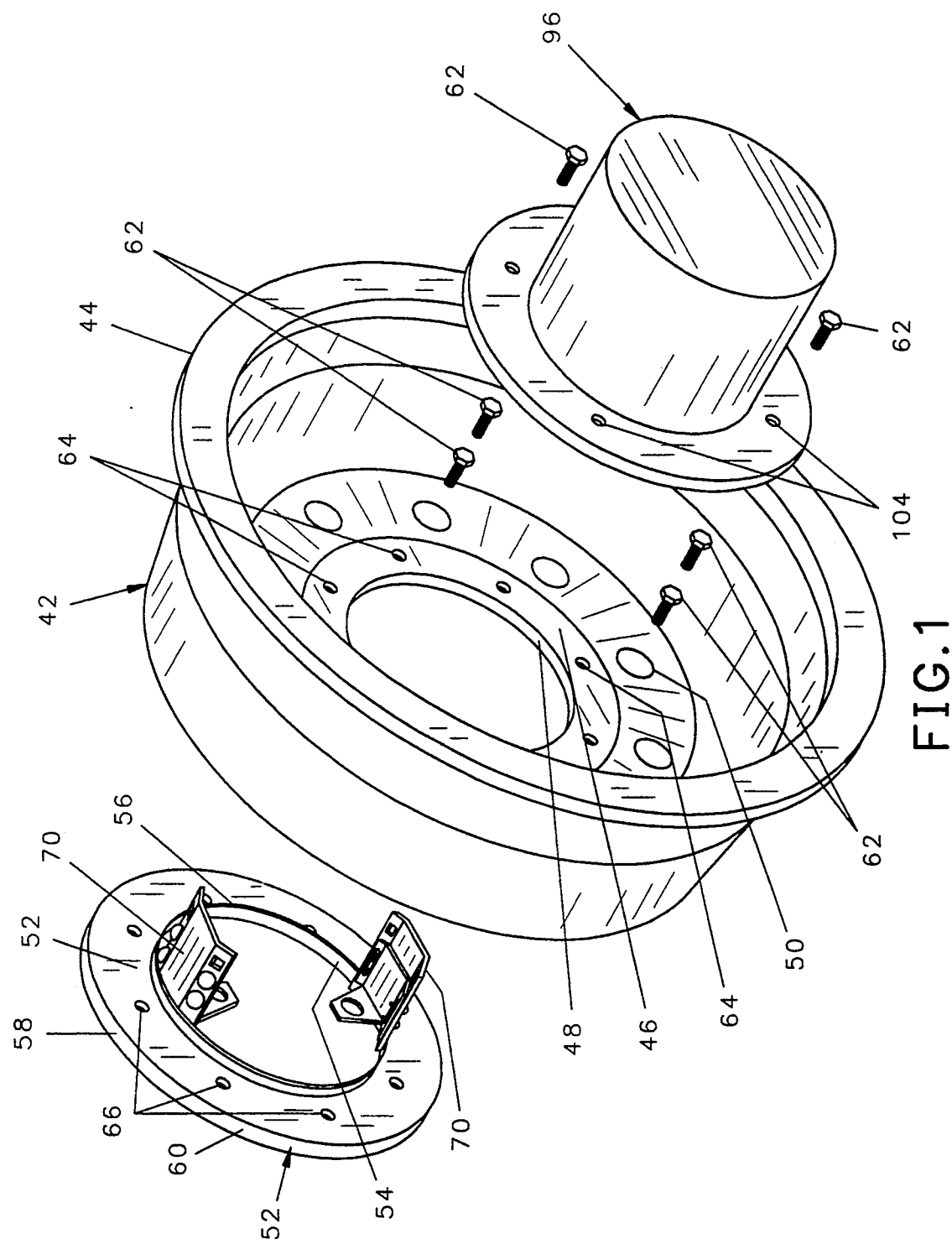
FIG. 1 is an exploded isometric view of a wheel liner constructed in accordance with the present invention.
Figure 2:
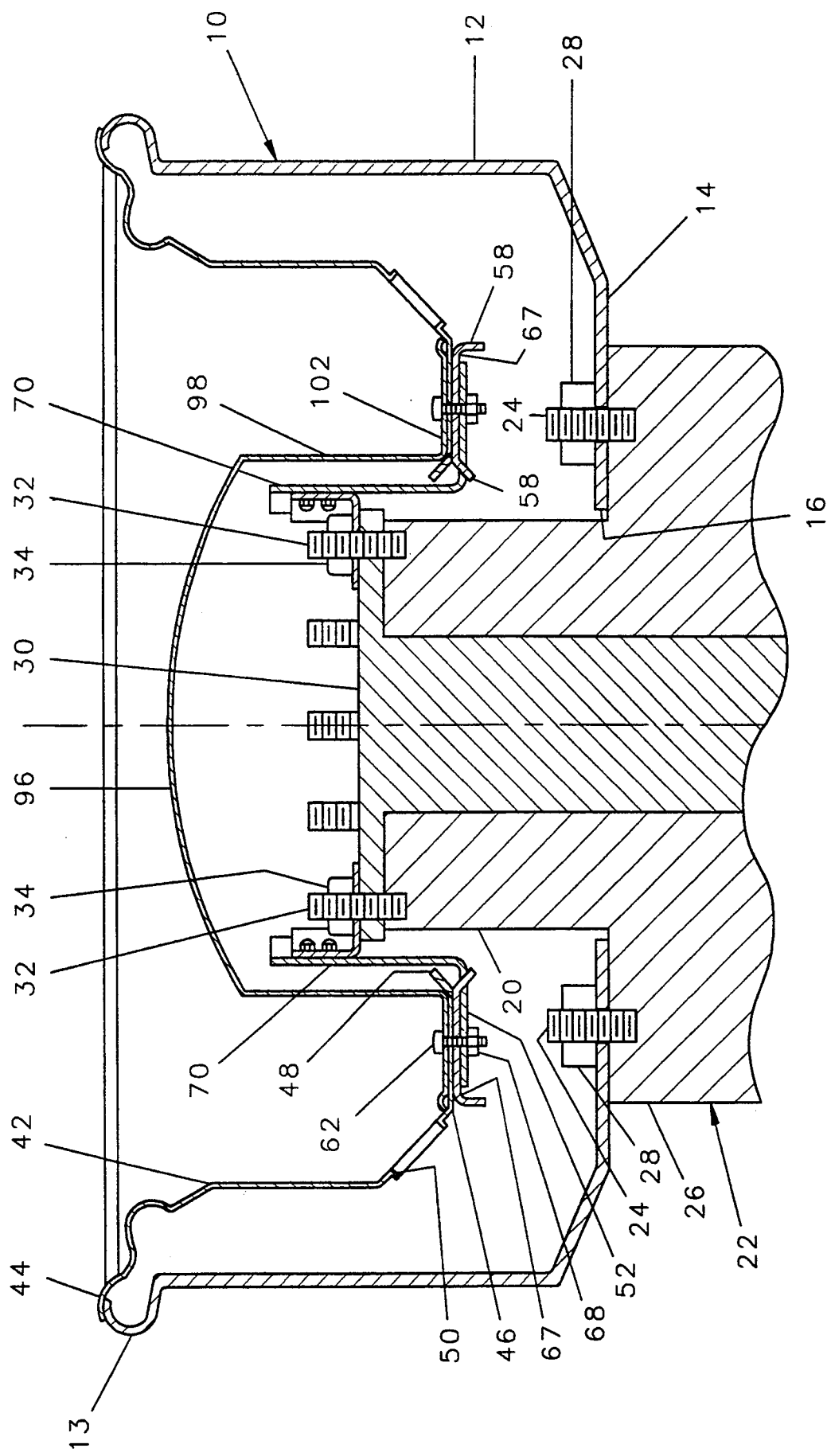
FIG. 2 is a cross-sectional view of the liner shown in FIG. 1 attached to a wheel of a truck.

Referring to FIG. 2, a typical truck wheel 10 has a generally tubular portion 12, at one end of which is an outer lip 13, and at the other end of the tubular portion 12 is a generally planar web section 14. The web section 14 has a central circular transverse opening 16 surrounded by a plurality of equally spaced transversed The central hole 16 and the plurality of spaced holes 18 are sized and positioned such that the central opening 16 will fit around a generally cylindrical oil hub 20 of an axle 22, and the plurality of spaced holes 18 are aligned to fit over a plurality of spaced wheel mounting studs 24 extending axially from an enlarged inner portion 26 of the hub 20. The wheel 10 is retained on the axle 22 by a plurality of lug nuts 28, one secured to the distal end of each of the wheel mounting studs 24. Typically there are 10 studs 24 spaced around the oil hub 20 of a truck axle for securing the wheel 10 thereto.

At the distal end of the oil hub 20 the truck axle 22 has an axle end member 30 which is retained by a plurality of axially extending studs 32 which are spaced around the perimeter of the oil hub 20 and which secure the axle end member 30 thereto by a plurality of nuts 34.

Fitted within the tubular portion 12 of the wheel 10 is a wheel liner 40 embodying the present invention. The wheel liner 40 has a generally tubular liner member 42 at one end of which is an outer lip 44 which is adapted to fit over the outer lip rim 13 of a wheel 10. The other end of the liner member 42 has a transverse generally planar section 46 which has a central opening 48 therein. The diameter of the opening is a little larger than the maximum diameter of a typical oil hub 20 of a truck axle 22 so as to fit slidably thereover. The liner member 42 may also have a plurality of decorative holes 50 spaced around the circumference of a portion thereof. Typically the liner member 42 is constructed of a thin metal, such as 20 gauge stainless steel which is stamped or hydroformed to the desired shape.

Positioned behind the planar section 46 of the liner member 42 is a generally planar ring member 52 which has an inner opening 54 around which is an axially extending annular reinforcing flange 56. At the outer circumference 58 of the ring member 52 is a second axially extending annular reinforcing flange 60. The ring member 52 is attached to the planar section 46 of the liner member 42 by means of a plurality of threaded bolts 62 which extend through spaced holes 64 in the planar section 46 of the liner member 42 into aligned holes 66 in the ring member 52 and which are threaded into a plurality of threaded nuts 68. Some of the nuts 68 are attached to the inner side 67 of the ring member 52, and others of the nuts 68 are not attached to the inner side 67 as further described below. The ring member 52 is typically made of a relatively heavy gauge metal, for example, 14 gauge stainless steel, and therefore, provides rigidity to the planar section 46 of the liner member 42.

Figure 3:
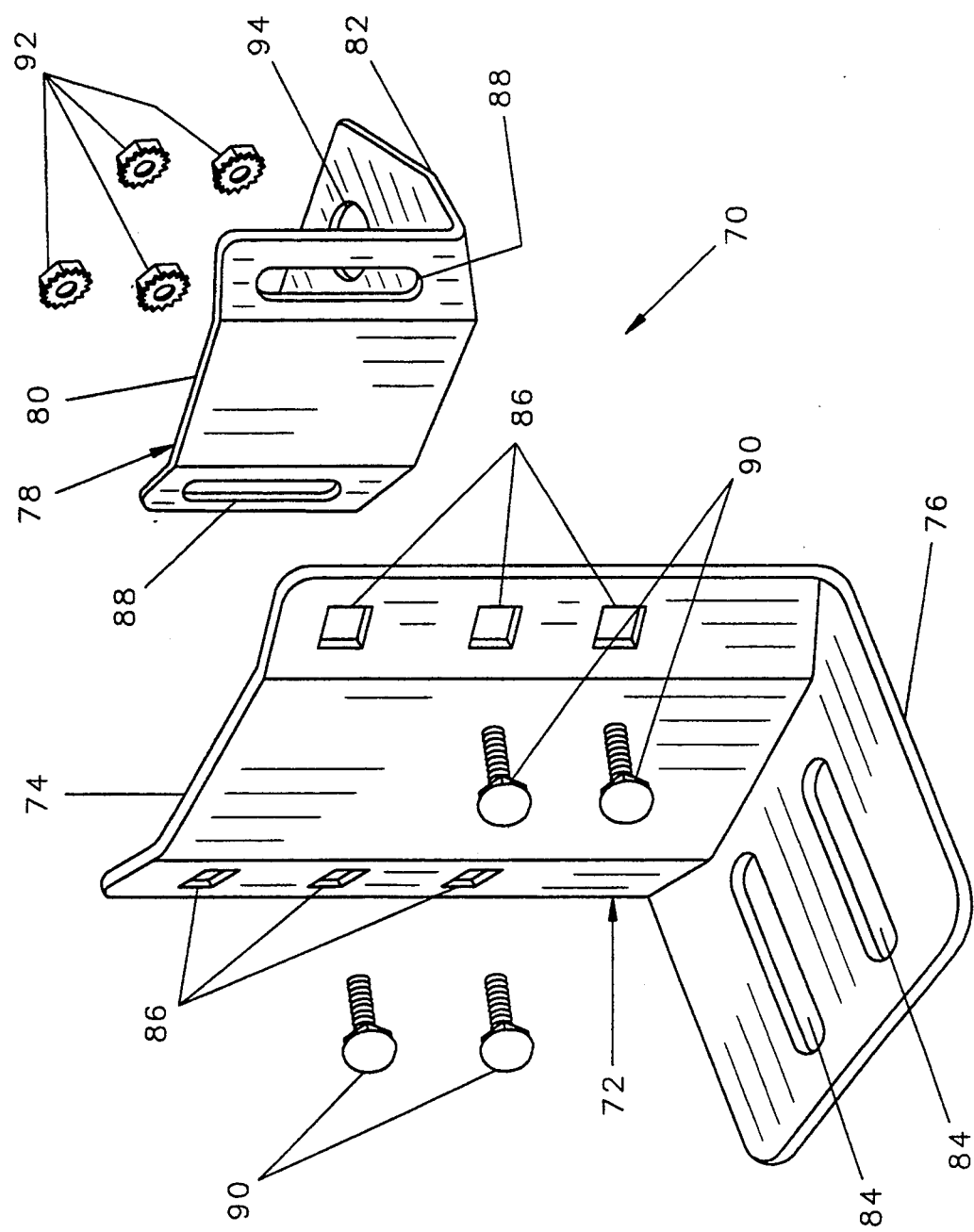
FIG. 3 is an enlarged exploded isometric view of a bracket for attaching the wheel liner of FIG. 1 to the hub of a truck wheel.

Referring to FIGS. 2 and 3, in order to attach the liner member 42 to the truck axle 22, two diametrically opposed brackets 70 are provided. Each of the brackets 70 has a first member 72 having a somewhat arcuately shaped body portion 74 and a transverse mounting portion 76 at one end thereof. A second member 78 also has a somewhat arcuately shaped body portion 80, and at one end thereof there is provided a transverse mounting portion 82.

Two parallel slots 84 in the mounting portion 76 of the first member 72 are each positioned and sized so as to receive the shank of one of the threaded bolts 62 such that the mounting portion 76 can be attached against the inner side 67 of the ring member 52 and retained thereon by one of the nuts 68. The nuts 68 which retain the first member 72 to the ring member 52 and the liner member 42 are those which were left unattached to the inner side 67 of the ring member 52 as described above.

The body portion 74 of the first member 72 has a plurality of longitudinally spaced rectangular holes 86, extending along each side thereof, and the body portion 80 of the second member 78 has a pair of longitudinal slots 88 spaced along each side thereof. The outer surface of the arcuately shaped body portion 80 of the second member 78 is adapted to nest within the inner surface of the arcuately shaped body portion 74 of the first member 72. Also, the holes 86 in the first member 72 and the slots 88 in the second member 78 are positioned and shaped such that the parts can be maintained in assembled relationship by a plurality of carriage bolts 90 which extend through four of the holes 86 and the aligned slots 88 and are retained therein by a plurality of nuts 92. The first and second body members 72,78 may then be adjustably joined together by selecting the appropriate sets of the holes 86 through which the bolt and nut assemblies 90,92 are positioned. The mounting portion 76 of member 72 is adjusted relative to the mounting portion 82 of the second member 78 so that the liner 40 can accommodate different widths of the cylindrical portion 12 of a truck wheel 10, and different lengths of an oil hub 20 of a truck axle 22. The mounting portion 82 of the second member 78 has a transverse hole 94 the diameter of which is a little larger than the diameter of the threaded studs 32 to which the nuts 34 are attached. The assembled bracket 70, therefore, has two ends, one end with a hole 84 for attachment to the liner member 42, and the other end with a hole 92 for attachment to a stud 32 of the oil hub 20.

To cover the distal end of the oil hub 20, a cover of the type known as a high hat 96 is provided. The high hat 96 has a generally tubular body 98 at one end of which is a generally dome shaped transverse outer end 100. An outwardly extending radial flange 102 surrounds the open end of the tubular portion 98, and the flange 102 has a plurality of spaced transverse holes 104 therein. The transverse holes 104 are sized and positioned so as to be aligned with some of the holes 64 in the planar portion 46 of the liner member 42 and with some of the holes 66 in the ring member 52 such that the ring member 52 may be retained thereon by some of the same bolts 62 which secure the ring member 52 and liner member 42 to each other. The nuts 68 into which the bolts 62 retaining the high hat 96 are threaded are attached to the inner side 67 of the ring member 52 such that the high hat 96 can be attached without requiring a wrench for the associated nuts 68.

To assemble a wheel liner 40 in accordance with the present invention to a truck axle 22 the nuts are removed from two opposing studs 32 of the oil hub 20. Then two first members 72 of the bracket 70 are attached to opposing sides of the line member 42 by assembling bolts 62 through diametrically opposing aligned holes in the liner member 42 and the ring member 52 and secured by nuts 68. The other bolts 62 and nuts 68 except those which align with the holes 104 of the high hat 96 and which are used to retain the high hat 96 may also be assembled at this time. The first member 72 of the bracket 70 are attached such that the body portions 76 thereof extend within the tubular portion of the liner members 42. The second members 78 of the brackets 70 are then adjusted and attached to the first members 72 such that the liner can be fitted on to the wheel 10 with the lip 44 thereof fitted over the outer lip 13 of the wheel 10 and the transverse holes 92 of the brackets 70 fitted over the studs 32 from which the nuts 34 have been removed. Once the liner has been so positioned, the nuts 34 can be reassembled to their associated studs 32 so as to retain the liner 40 against the wheel 10. Finally, the high hat is fitted over the distal end of the oil hub 20 and secured by a second plurality of bolts 62 which are fitted in the holes 104 thereof and threaded into the remaining nut 68 attached to the ring member 52.

While the present invention has been described in connection with a single preferred embodiment, it will be understood by those skilled in the art that many changes and modifications made be made without departing from the true spirit and scope of the present invention. It is therefore intended by the appended claims to cover all such changes and modifications which come within the true spirit and scope of the invention.

I claim:

1. A wheel liner for covering portions of a truck wheel of the type having a generally planar hub section and a generally tubular section extending outwardly of said hub section defining an outer rim, and over which a tire is adapted to be mounted, said hub section of said truck wheel being adapted to be mounted over a first plurality of wheel mounting lugs on the axle of a truck, said axle having a centrally located oil hub extending axially outwardly of said wheel mounting lugs and having a second plurality of threaded studs positioned radially inward of said first plurality of mounting lugs, said wheel liner comprising in combination:

a liner member having an outer lip for fitting against said outer rim of a wheel, and a central opening for fitting over an oil hub, a first bracket member, first attachment means for attaching said first bracket member to said liner member, a second bracket member, second attachment means for attaching said second bracket member to at least one of said second plurality of threaded studs of an axle of a truck, third attachment means for attaching said first bracket member to said second bracket member, said third attachment means being longitudinally adjustable for axial adjustment of said liner member relative to said second attachment means.

2. A wheel liner in accordance with claim 1 further comprising a high hat having a radially outwardly extending flange at one end thereof for attachment to said liner member.

3. A wheel liner in accordance with claim 1 wherein said third attachment means comprises a plurality of holes in one of said first and second bracket members and a threaded stud extending through one of said plurality of holes for attaching said first and second bracket members to each other.

4. A wheel liner in accordance with claim 3 further comprising a hub cover member having a radially outwardly extending flange at one end thereof for attachment to said liner member.

5. A wheel liner in accordance with claim 1 wherein said first bracket member is attached to said first liner member adjacent said central opening.

\* \* \* \* \*

UNITED STATES PATENT AND TRADEMARK OFFICE
CERTIFICATE OF CORRECTION

PATENT NO. : 5,358,313
DATED : October 25, 1994
INVENTOR(S) : John G. Polka

It is certified that error appears in the above-indentified patent and that said Letters Patent is hereby corrected as shown below:

Column 2, line 46, after "transverse" insert -- holes 18--.

Signed and Sealed this

Twenty-fourth Day of January, 1995

Attest:

BRUCE LEHMAN

Attesting Officer    Commissioner of Patents and Trademarks